United States Patent [19]

Fong

[11] 3,954,693

[45] May 4, 1976

[54] COATING

[75] Inventor: Calvin C. Fong, Beverly Hills, Calif.

[73] Assignee: Lockheed Aircraft Corporation, Burbank, Calif.

[22] Filed: Sept. 24, 1973

[21] Appl. No.: 400,222

[52] U.S. Cl............................ 260/37 N; 260/47 CB; 260/77.5 AP; 428/339
[51] Int. Cl............................................ C08q 22/08
[58] Field of Search ............... 260/47 CB, 77.5 AP, 260/37 N

[56] References Cited
UNITED STATES PATENTS

| | | | |
|---|---|---|---|
| 2,594,979 | 4/1952 | Nelson | 161/184 |
| 2,897,166 | 7/1959 | Eitel et al. | 260/22 TN |
| 3,061,483 | 10/1962 | Coles et al. | 204/159.13 |
| 3,124,605 | 3/1964 | Wagner | 260/2.5 AT |

OTHER PUBLICATIONS

Lee et al., Handbook of Epoxy Resins, McGraw–Hill, N.Y., 1967, pp. (10)18, (15)9–11, (15)13–15, (19)12–14 & (24)36.
Chem. Abstracts (Senda et al.) 49, 1955, p. 9321f.
Chem. Abstracts (Moeller), 70, 1969, p. 68991z.

*Primary Examiner*—M. J. Welsh
*Attorney, Agent, or Firm*—Billy G. Corber; Lowell G. Turner

[57] ABSTRACT

A novel improved urethane, urethane coating formed of epxoy resin and polyisocyanate for metallic or nonmetallic substrates and the like exhibits improved resistance to blistering under high moisture conditions. The coating includes an epoxy resin having functional hydroxyl groups, for example, the reaction product of epichlorohydrin and bisphenol A. A hardener is included which comprises one or more selected polyisocyanates, preferably a mixture of a selected aliphatic biuret type polyisocyanate and an aromatic diisocyanate. A coupling agent, preferably an epoxy-containing silane, is included. A catalyst such as zinc octoate, pigments such as leachable chromates and organic solvent for the components may also be included. The pigments are held in suspension through the use of a suspending agent. The ratio of —OH groups of the epoxy resin to —NCO groups in the hardener is about 1:1.4–3.6.

16 Claims, No Drawings

COATING

BACKGROUND AND SUMMARY OF THE INVENTION

The present invention generally relates to coating compositions, including primers for metallic and nonmetallic substrates, and topcoats, clear or pigmented.

Difficulties have been encountered in providing durable protective coatings for metallic substrates and the like, such as exterior aircraft components, which are subject to flexing forces and/or which are exposed to adverse environmental conditions such as heat, cold, ultraviolet radiation, high moisture conditions, wind, snow, salt spray, particle impingement, smog, and other harmful environmental factors. The coatings tend to easily peel, chip, blister, or otherwise separate from the substrate, necessitating frequent and costly scraping and recoating operations. Coatings on interior components also deteriorate as a result of exposure to wide humidity changes, abrasions, sudden impacts, and contact with corrosive hydraulic fluids, cleaning fluids, dirt, grime and the like.

Many of the foregoing durability problems can be attributed to the unsatisfactory adhesion of the coating to the substrate surface. On the other hand, difficulties have also been encountered in stripping of coatings, particularly when aged, when non-acid and non-phenolic type strippers are used. As a result, one must often resort to acidic and phenolic strippers which present disposal and corrosion problems.

Accordingly, there has been a need for a coating which can tightly and durably bond to the substrate (and to a top coating, if used as a primer) but which can be readily stripped using standard non-acidic and non-phenolic strippers. The coating must resist peeling, blistering and other separation under adverse conditions, including highly variable humidity conditions. The coating must also remain flexible and resist abrasion and impact and, if necessary, serve as an effective protective coating layer. Such a coating would be useful as a primer or topcoat on any surface exposed to a harsh environment such as the exterior surfaces of aircraft, trains, trucks, ocean vessels, bridges, automobiles and space ships.

BRIEF DESCRIPTION OF THE INVENTION

The foregoing needs have been satisfied by the improved coating of the present invention. The coating can, in part, be characterized as a mixture of selected concentrations of (a) an hydroxyl-bearing epoxy resin, (b) a hardener in the form of selected polyisocyanate, preferably a mixture of a selected aliphatic biuret polyisocyanate and an aromatic diisocyanate, and (c) a coupling agent in the form of an epoxy-type silane or the like.

The coating also includes pigments, preferably those which have controlled leaching rates, suspending agent for the pigments, a catalyst to speed the reaction between the hardener and epoxy resin and organic solvent for the epoxy resin and hardener. The coating can be set and cured at room temperature (50°–75°F) whereas a temperature of 120°F or more is usually necessary for common resinous primer coatings. When cured, the composition firmly adheres to aluminum and to other metal substrates, as well as to nonmetallic substrates and has greatly improved resistance to peeling and blistering under varying conditions, including high moisture conditions, over a wide range of temperatures, such as are encountered during use in aircraft applications. Additional features of the coating are set forth in the following detailed description.

DETAILED DESCRIPTION

The novel coating composition of the present invention includes as an essential component an epoxy resin containing a substantial number of hydroxy groups. For example, the reaction product of an epihalohydrin, such as epichlorohydrin, and a polyol, such as glycerol, can be used. Preferably the polyol is a polyhydric phenol, most preferably a bis-hydroxyphenyl alkane, such as Bisphenol A. Bisphenol A has the chemical name 2,2bis(4-hydroxyphenyl)propane, and the formula

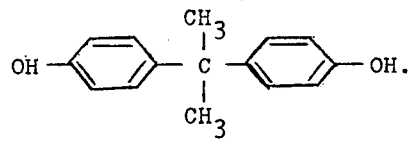

Epichlorohydrin has the general formula $C_3H_5OCl$, more specifically

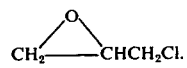

The resinous glycidyl ether reaction product of Bisphenol A (1 mole) and epichlorohydrin (about 2 moles), usually prepared at about 75°–125°F, has a molecular weight of about 300–1100, depending upon the extent of polymerization and has the structural formula:

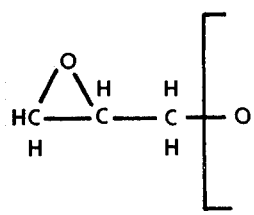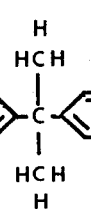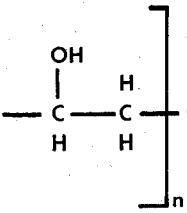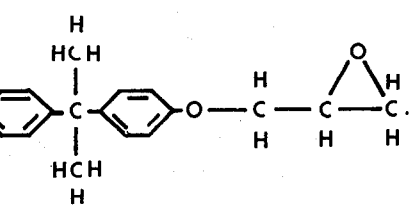

Polyhydric phenols such as resorcinol, catechol, hydroquinone, methyl resorcinol and bis-hydroxyphenyl alkanes such as 2,2-bis(4-hydroxyphenol) butane, 4,4'-dihydroxybenzophenone, bis(4-hydroxyphenyl) ethane, 2,2-bis(4-hydroxyphenyl) pentane and 1,5-dihydroxynaphthalene can, for example, be used in place of the Bisphenol A in the preparation of the epoxy resin. Other homologs, isologs and analogs can be used. The extent of polymerization desired is that which provides epoxy resin equivalent weights within the range of about 300–3000, usually in the lower portion of that range.

A second essential component of the novel coating is the hardener. This material is comprised of selected polyisocyanate which reacts with the epoxy resin to set and cure the composition. Specifically, the —NCO groups of the hardener react with the —OH groups of the epoxy resin to form urethane linkages according to the following general reaction:

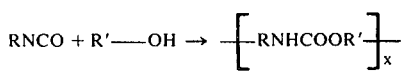

where R includes an —NCO group and R' includes an —OH group to assure polymerization of the composition.

The polyisocyanate preferably comprises aliphatic biuret-type polyisocyanate, aromatic polyisocyanate (preferably diisocyanate) or a mixture thereof. Preferably, the biuret-type polyisocyanate is used, either alone or (more preferably) in a mixture with aromatic diisocyanate. The average equivalent weight is usually in the 200–400 range, although equivalent weights within the range of about 180–450 can be used.

The aliphatic biuret-type polyisocyanate is as disclosed in U.S. Pat. No. 3,124,605, issued Mar. 10, 1964 for Biuret Polyisocyanates to Kuno Wagner. In this regard, the polyisocyanate is characterized as a compound having not more than six —NCO groups and the formula:

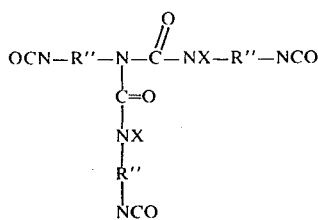

wherein X is selected from hydrogen and the grouping —CO—NX—R''—NCO, and R'' is the organic radical left after removal of the two —NCO groups from an organic diisocyanate selected from the group consisting of cyclohexane diisocyanate, hexamethylene diisocyanate, phenylene diisocyanate, lower alkyl substituted phenylene diisocyanate, dicyclohexyl diisocyanate and chloro-substituted phenylene diisocyanate, the hydrogen being the only one on the compound which is reactive with an —NCO group.

A specific example of the biuret polyisocyanate is tri-N,N',N''-(3-isocyanate-4-methylphenyl)-biuret. Such polyisocyanates are sold by Mobay Chemical Company, Pittsburg, Pa. under the name DESMODUR N-75, a trademark of Farbenfabriken Bayer, AG, West Germany. They are in liquid form, i.e. as a solution, usually in a 1 to 1 blend of ethylglycol acetate and xylol, have an average NCO content of about 16.5%, an average equivalent weight of about 254 and a specific gravity at 25°C of about 1.06.

Aromatic polyisocyanate can be used as a component in the hardener of the coating composition. For example, m-phenylene diisocyanate, 2,4- and 2,6-hexamethylene-1, 6-diisocyanates, tetramethylene-1,4-diisocyanate, hexahydrotolylene diisocyanate (and isomers), naphthylene-1,5-diisocyanate, 1-methoxyphenyl-2,4-diisocyanate, 3,3'-dimethoxy-4,4'-biphenyl diisocyanate, 3,3'-dimethyl-4,4'-biphenyl diisocyanate, and 3,3'-dimethyldiphenyl O methane-4,4'-diisocyanate can be used. So also can triisocyanates such as 4,4',4''-triphenylmethane triisocyanate, polymethylene polyphenylisocyanate and tolylene 2,4,6-triisocyanate and tetraisocyanates such as 4,4'-dimethyldiphenyl-methane 2,2'5,5'-tetraisocyanate. However, tolylene-2,4-diisocyanate and/or tolylene-2,6-diisocyanate are preferred. For example, tolylene diisocyanate based adduct suitable for use in the coating is sold commercially under the trademark MONDUR CB-75 by Mobay Chemical Company, Pittsburgh, Pennsylvania. MONDUR CB-75 has an average NCO content of about 13%, an average equivalent weight of 323 and a specific gravity of 1.19 at 25°C.

The best properties for the present coating composition usually are obtained when the described aliphatic biuret polyisocyanate is used with an aromatic diisocyanate, such as tolylene 2,4-diisocyanate, in a weight ratio of the aliphatic biuret to the aromatic diisocyanate of about 0.8–4:1. With such ratios, adhesion of the coating to the substrate is strongest, as is resistance to water or moisture penetration and consequent blistering, peeling and chipping of the coating from the substrate.

The epoxy resin and hardener are utilized in the coating composition of the invention in a ratio of —OH groups of the epoxy resins to —NCO groups of the hardener of about 1:1.4–3.6. The preferred ratio is usually about 1:1 for best results.

A coupling agent is employed in the coating composition and preferably is a silane of the epoxy or epoxide type. The coupling agent helps improve bonding between the coating and the substrate to which the coating will be applied. Silane coupling agents are members of a family of organosilicon monomers characterized by the general structure: $(R''O_3)_3Si(CH_2CH_2CH_2)_xR'$ where R' is an organic functional group, preferably an epoxy functional group for present purposes, R''O is a hydrolyzable alkoxy group and $x$ is 0 or 1. One preferred coupling agent for the coating is gamma-glycidoxy propyl trimethoxy silane having the formula:

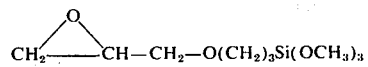

This silane is a liquid soluble in acetone, benzene and other organic solvents and has a boiling point of 120°C. The silane is usually utilized in the coating in a concentration of about 0.2–5 percent, by weight of the epoxy resin. Such a silane can be purchased commercially from Dow Corning Corporation, Midland, Michigan under the trademark DOW CORNING Z-6040 Silane. It has a viscosity at 25°C of 3 centistokes and a flash point (open cup) of 175°C. It has a specific gravity at 25°C of 1.070 and consists of 100 percent solids. Other suitable silane coupling agents and concentrations can be used.

The coating preferably includes corrosion resistant pigment, for example one or more chromates. Most preferably, several of such pigments, each with a different leaching rate, are employed. In this regard, a mixture of, for example, basic zinc chromate ($ZnCrO_4$) with a pH of about 8, strontium chromate ($SrCrO_4$) and cobaltous chromate ($CoCrO_4$) can be used, with the zinc chromate the fastest leaching and the cobaltous chromate the slowest leaching. The mixture provides the coating with substantially continuous leaching properties. In this regard, the pigment reacts with water (leaching) to form a protective coating.

The pigments preferably are provided in a specific particulate size range, namely, within the range of 4H to 7H (Hegman Standard Graduations) as defined by the Gardner grind gage test. This test is identified as Method 4411.1 (Sept. 1, 1965) of Federal Test Method Standard No. 141a. The gage is a hardened steel block about 7×2.5×0.5 inch with a smooth flat top surface, bearing a groove 5.25×0.5 inch ×4.0 mils in depth (tapered to conform to Hegman Standard Graduations). A double-wedge steel blade (3.5×1.5×0.25 inch) is used to scrape a strained amount of pigment (poured to overflow the deep end of the groove) from the deep to the shallow end of the groove. The gage is then viewed from the side to determine the distribution of particles relative to the Hegman calibrations (fineness of grind). The pigments are used in the coating usually in a concentration range of about 25–150 percent, by weight of the epoxy resin.

It is preferred to use a suspending agent for the pigments whenever appreciable amounts of the latter are used in the coating. The suspending agent preferably is of the non-surfactant type and may be, for example, finely divided pyrogenic silica or the like inorganiic agent. One such product in colloidal form is commercially available under the trademark CABO-O-SIL from Cabot Corporation. Another such product containing submicroscopic particles is sold commercially under the trademark AEROSIL R-972 by Degussa, Inc. Organic derivatives of hydrous magnesium aluminum silicate can also be used, such as are sold under the Trademark BENTONE by National Lead Company. Usually, the suspending agent is utilized in a concentration of about 0.1–4 percent, by weight of the epoxy resin in the primer, the amount varying according to the concentration of pigments in the coating.

A catalyst is usually employed in the coating to speed the reaction between the epoxy resin and polyisocyanate hardener. For example, zinc octoate in a concentration of about 0.1–10 percent, by weight of the epoxy resin, can be used. So also can other suitable catalysts; for example, dibutyl tin dilaurate, tertiary amines and other organometallic compounds.

The coating also includes a volatile organic solvent system to keep the epoxy resin and polyisocyanate in solution until reacted. For such purposes, ketones, nitropropane, mono- and dialkyl ethers of ethylene glycol can be used, among others. They are selected as to type and concentration in order to effectively control the evaporation rate of the coating and the effectiveness with which they dissolve the resins of the coating. Any suitable total concentration of such solvents can be used, for example, from about 40% to about 85% by volume of the coating.

It is preferred, in preparing the coating of the present invention, to first mix together the epoxy resin, coupling agent, pigment, suspending agent, catalyst and a portion of the solvent to form a base solution. The polyisocyanate(s) can then be mixed with the remainder of the solvent to form the hardener. The coupling agent can, if desired, be present in the hardener rather than in the base solution or it can be present in both the hardener and base solution, if desired.

It is necessary to keep the hardener separate from the base solution to prevent premature setting of the composition until it is desired to use the coating, whereupon these two can be mixed together. However, if the coating is to be formulated and then used immediately, all ingredients can be added substantially simultaneously. The coating can be set and cured at room temperature, e.g. 50°–100°F over the usual humidity range. The setting time of the coating will depend upon solvent concentration, ambient temperature, humidity, and the relative types and concentrations of coating ingredients. However, setting times of about 30 minutes (initial curing) to about 168 hours (final curing) are usually encountered.

Certain further features are set forth in the following specific Examples.

EXAMPLE I

A base solution for the coating of the invention was prepared by mixing together the ingredients specified in Table I below:

TABLE I

| | Ingredient | Concentration, % |
|---|---|---|
| 1. | Epoxy resin-glycidyl ether reaction product of epichlorohydrin and Bisphenol A; equivalent weight = 475–575. | 16.00. |
| 2. | Glycidoxy propyl trimethoxy silane | 0.40 |
| 3. | Cobaltous chromate | 0.71 |
| 4. | Basic zinc chromate | 18.00 |
| 5. | Strontium chromate | 2.98 |
| 6. | Colloidal pyrogenic silica as suspending agent | 5.00 |
| 7. | Fillers (1) | 12.00 |
| 8. | Zinc octoate catalyst (10% by weight solution in xylene) | 4.00 |
| 9. | Solvents: | |
| | a) Cellosolve acetate | 7.00 |
| | b) N-butyl acetate | 8.00 |
| | c) Toluene | 9.00 |
| | d) Methyl ethyl ketone | 16.91 |

1. 50:50 mixture of calcium carbonate, talc, to add bulk and weight.

A hardener for the base solution was prepared by mixing together the ingredients set forth in Table II below:

TABLE II

| | Ingredient | Concentration |
|---|---|---|
| 1. | Tri-N,N',N''-(3-isocyanate-4-methylphenyl)-biuret | 35.74 |
| 2. | Tolylene - 2,4-diisocyanate | 19.46 |
| 3. | Solvents | |
| | a) 99% Cellosolve acetate | 19.86 |
| | b) N-butyl acetate | 22.22 |
| | c) 99% Ethyl acetate | 1.51 |
| | d) Toluene | 1.21 |

The base solution from Table I was then mixed with the hardener from Table II to provide the coating of the invention. This coating was then coated on a plurality of 0.020 inch thick panels of aluminum to an average coating thickness of about 0.8 mil, dried for ½ hour, allowed to cure at 50 F for a minimum of 168 hours and then tested as follows.

Several of the panels were tested by Method 6301 (Sept. 1, 1965) of Federal Test Method Standard No. 141a (adhesion-wet-tape test). In this test, each panel was immersed in distilled water for 24 hours, after which the panels were wiped dry. Within 1 minute thereafter 2 parallel scratches, 1 inch part, were made through the coating with a stylus. A 1 inch wide strip of special testing tape, sold by the 3M Company under code designation No. 250, was immediately applied across the scratches and pressed tightly in place with a 4.5 pound rubber roller (Durometer hardness 70–80), after which the tape was removed in one quick motion. The previously taped area was then examined for damage to the coating. All panels tested showed firm adhesion of the coating to the substrate with no blistering, peel-off or chipping.

In a second test, several of the coated panels were immersed for 168 hours in distilled water, then removed and examined for loss of adhesion to the aluminum. Similar tests were conducted with panels of titanium, stainless steel and fiberglass. In each test, no blistering, chipping or peeling was noted.

In a third test, several of the coated panels were immersed for 30 days at room temperature in hydraulic fluid (phosphate ester type), then withdrawn and inspected for softening, loss of thickness, loss of adhesion and blistering. No softening, adhesion loss or reduction in coating depth was noted.

In a fourth test, resistance of the panels to salt spray was determined by exposing the coated panels to a 5 percent concentration of pure sodium chloride in distilled water, as per method 6061 (Sept. 1, 1965) of Federal Test Method Standard No. 141a. The test was carried out by spraying the panels with the solution for 2000 hours at an ambient temperature of about 95°F. The coated sides of the panels were then inspected for blistering and corrosion. No blistering or corrosion was noted.

In a fifth test, coated aluminum panels were tested by Method 6216 (Sept. 1, 1965) (Blocking test) of the Federal Test Method Standard No. 141a for any tendency of the coated surfaces to stick together. The panels were stacked in groups 3 each and kept in an oven for 24 hours at 120°F ± 2°F., while each stack was compressed by a weight exerting 10 pounds force per square inch. THe weight was then removed, and the panels were cooled to 70°–80°F and inspected for coating transfer between panels. No transfer was noted.

In a sixth test, the coated panels were tested for flexibility by method 6221 (Sept. 1, 1965) of the Federal Test Method Standard No. 141a. In this test, each panel was held at 73.4° ± 2°F. and at a relative humidity of 50 ± 4 percent for one-half hour and then placed on a ⅛ inch steel rod mandrel with the coated side of the panel up. Each panel was then bent double over the mandrel in 1 second. The coating at the bend was examined under a magnification of 7 diameters for cracks. No cracks were observed.

In a seventh test, the coated panels and a ⅛ inch diameter mandrel were maintained at −40°F maximum temperature for 48 hours. The panels were then bent 180° around the mandrel while at −40°F and there was no evidence of loss of adhesion and no evidence of cracking.

In an eighth test, the coated panels were tested for impact flexibility by method 6226 (Sept. 1, 1965) of the Federal Test Method Standard No. 141a on a G. E. Impact-Flexibility Tester by concussing successively two adjacent points on opposite sides of the panel and noting any film breaks in the coating. No coating breaks were noted.

In a ninth test, the coated panels were subjected to the reversed impact of a 60 pound steel ball (standard Gardner steel ball test) and showed no coating breaks.

In a tenth test, the coated panels were tested for stripability after being placed in an oven at 250° ± 10°F for 72 hours. The coating was easily removed after 30 minutes dwell in a non-acid, non-phenolic paint stripper conforming to MIL-R-81294.

In an eleventh test, the coated panels were scribbed through to the substrate metal and exposed to vapors of concentrated hydrochloric acid for one hour and then placed in a humidity chamber maintained at 102° ± 2°F and 75 ± 2% relative humidity for 5 weeks. The panels showed not corrosion extending more than ⅛ inch from the scribbed line or from the edges of the panels.

From the above tests, the coating was shown to have improved adhesion under high moisture, high salt corrosion, flexing and impact conditions, as well as chemical corrosion conditions. When stainless steel, cold rolled steels, fiberglass, wood and titanium panels, with normal surface preparation, are substituted for the aluminum panels, the results are similar.

EXAMPLES II–IV

A series of coating compositions are prepared utilizing the procedure of Example I and the ingredients specified in Table III below:

TABLE III

| | Ingredient | Composition (Concentration in Coating, %) | | |
|---|---|---|---|---|
| | | Example II | Example III | Example IV |
| 1. | Epoxy resin-reaction products of epichlorohydrin and Bisphenol A, equivalent wt=475-2000. | 8.00 | 9.00 | 8.00 |
| 2. | Tri-N,N',N''-(3-isocyanate-4-methylphenyl)-biuret. | 21.00 | 21.00 | 22.00 |
| 3. | Tolylene-2,4-diisocyanate. | 9.00 | 13.00 | 9.00 |
| 4. | Pigments | | | |
| | a) Cobalt chromate | 0.40 | 0.36 | 0.38 |
| | b) Basic zinc chromate | 8.00 | 9.00 | 9.00 |
| | c) Strontium chromate | 2.00 | 4.00 | 5.00 |
| | d) Fillers | 4.00 (calcium carbonate) | 4.50 (talc) | 4.00 (calcium carbonate) |
| 5. | Suspending agent | 2.50 (Bentone) | 2.40 (CAB-O-SIL) | 2.60 (pyrogenic silica) |
| 6. | Glycidoxy propyl trimethoxy silane | 0.22 | 0.24 | 0.26 |
| 7. | Catalyst | 0.20 (zinc octoate) | 0.20 (dibutyl tin dilaurate) | 0.22 (zinc octoate) |
| 8. | Solvents | | | |
| | a) Cellusolve acetate | 14.00 | 11.00 | 12.00 |
| | b) N-butyl acetate | 15.10 | 12.60 | 12.58 |
| | c) Toluene | 5.55 | 4.60 | 5.00 |
| | d) Ethyl acetate | 0.74 | — | — |

TABLE III-continued

| Ingredient | Composition (Concentration in Coating, %) | | |
|---|---|---|---|
| | Example II | Example III | Example IV |
| e) Methyl ethyl ketone | 9.30 | 81.10 | 10.00 |

The coatings of the present invention are particularly noteworthy in their ability to resist blistering, peeling and chipping when exposed to high moisture conditions over an extended period of time. Moreover, they are easy to apply, simple to prepare, can be set and cured at ambient temperature in a relatively short period of time. While the coating has primary utility as a base coating for metallic substrates, it is also useful for other types of substrates and can be used as a single coating in some applications. Further advantages of the composition of the present invention are as set forth in the foregoing.

Various modifications, changes, alterations, and additions can be made in the present composition, in its ingredients and their relative concentrations an in the manner of application and use of the coating. All such modifications, changes, alterations and additions as are within the scope of the appended claims form part of the present invention.

What is claimed is:

1. A substrate coating having improved strippability with non-acid strippers and improved resistance to blistering, comprising the product obtained by mixing together the following components:
   an epoxy resin containing functional hydroxy groups;
   a hardener comprising a biuret polyisocyanate and an aromatic polyisocyanate, the weight ratio of said biuret polyisocyanate to said aromatic polyisocyanate being about 0.8–4:1, said biuret polyisocyanate having not more than six —NCO groups and having the formula

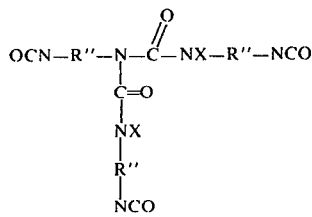

wherein X is selected from the group consisting of hydrogen and the grouping —CO—NX—R"—NCO and R" is the organic radical left after removal of the two —NCO groups from an organic diisocyanate selected from the group consisting of cyclohexane diisocyanate, hexamethylene diisocyanate, phenylene diisocyanate, lower alkyl substituted phenylene diisocyanate, lower alkoxy phenylene diisocyanate, diphenylmethane diisocyanate, dicyclohexyl diisocyanate and chloro-substituted phenylene diisocyanate, said hydrogen being the only one on the compound which is reactive with an —NCO group; and
   a coupling agent for facilitating bonding with a substrate.

2. The improved coating of claim 1 wherein said coupling agent comprises epoxy linkage-containing silane.

3. The improved coating of claim 2 wherein said silane comprises gamma-glycidoxy-propyl trimethoxy silane.

4. The improved coating of claim 2 wherein said silane is present in a concentration of about 0.2–5.0 percent, by weight of said epoxy resin.

5. The improved coating of claim 1 wherein said epoxy resin comprises the glycidyl polyether reaction product of epihalohydrin and polyol.

6. The improved coating of claim 5 wherein said polyol comprises polyhydric phenol.

7. The improved coating of claim 6 wherein said epoxy comprises the reaction product of epichlorohydrin and 2,2-bis(4-hydroxyphenyl)propane.

8. The improved coating of claim 1 wherein said aromatic diisocyanate comprises 2,4-tolylene diisocyanate adduct.

9. The improved coating of claim 1 wherein the ratio of —OH groups in said epoxy resin to —NCO groups in said hardener is about 1:1.4–3.6.

10. The improved coating of claim 1 including pigment and suspending agent for said pigment.

11. The improved coating of claim 10 wherein said pigment includes a plurality of chromates having differing leaching rates.

12. The improved coating of claim 11 wherein said pigments are present in a concentration of about 25–150 percent, by weight of said epoxy resin.

13. The improved coating of claim 10 wherein said suspending agent comprises a non-surfactant colloidal pyrogenic silica in a concentration of about 0.1–4 percent by weight of said coating.

14. The improved coating of claim 1 including at least one catalyst and at least one organic solvent.

15. The improved coating of claim 1 wherein said catalyst comprises zinc octoate for accelerating reaction between said hardener and said epoxy resin and wherein said catalyst is in a concentration of about 0.1–10 percent by weight of said epoxy resin.

16. The improved coating of claim 8 wherein said epoxy comprises the reaction product of epichlorohydrin and 2,2-bis(4-hydroxyphenyl)propane, wherein the ratio of —OH groups in said epoxy resin to —NCO groups in said hardener is about 1:1.4–3.6, wherein said coupling agent comprises gamma-glycidoxy-propyl trmethoxy silane present in a concentration of about 0.2–5.0 percent, by weight of said epoxy resin, wherein said coating includes pigment, suspending agent for said pigment, catalyst and solvent, wherein said pigment includes a plurality of metal chromates of differing leaching rates in a combined concentration of about 25–150 percent, by weight of said epoxy resin, wherein said suspending agent comprises non-surfactant colloidal pyrogenic silic in a concentration of about 0.1–4 percent, by weight of said coating, wherein said catalyst comprises zinc octoate in a concentration of about 0.1–10 percent by weight of said epoxy resin and wherein said solvent is at least one organic solvent for said catalyst, epoxy resin and hardener.

* * * * *